March 27, 1956  F. S. ARGUELLES  2,739,805
PRECISION BALANCE
Filed June 2, 1953  4 Sheets-Sheet 1
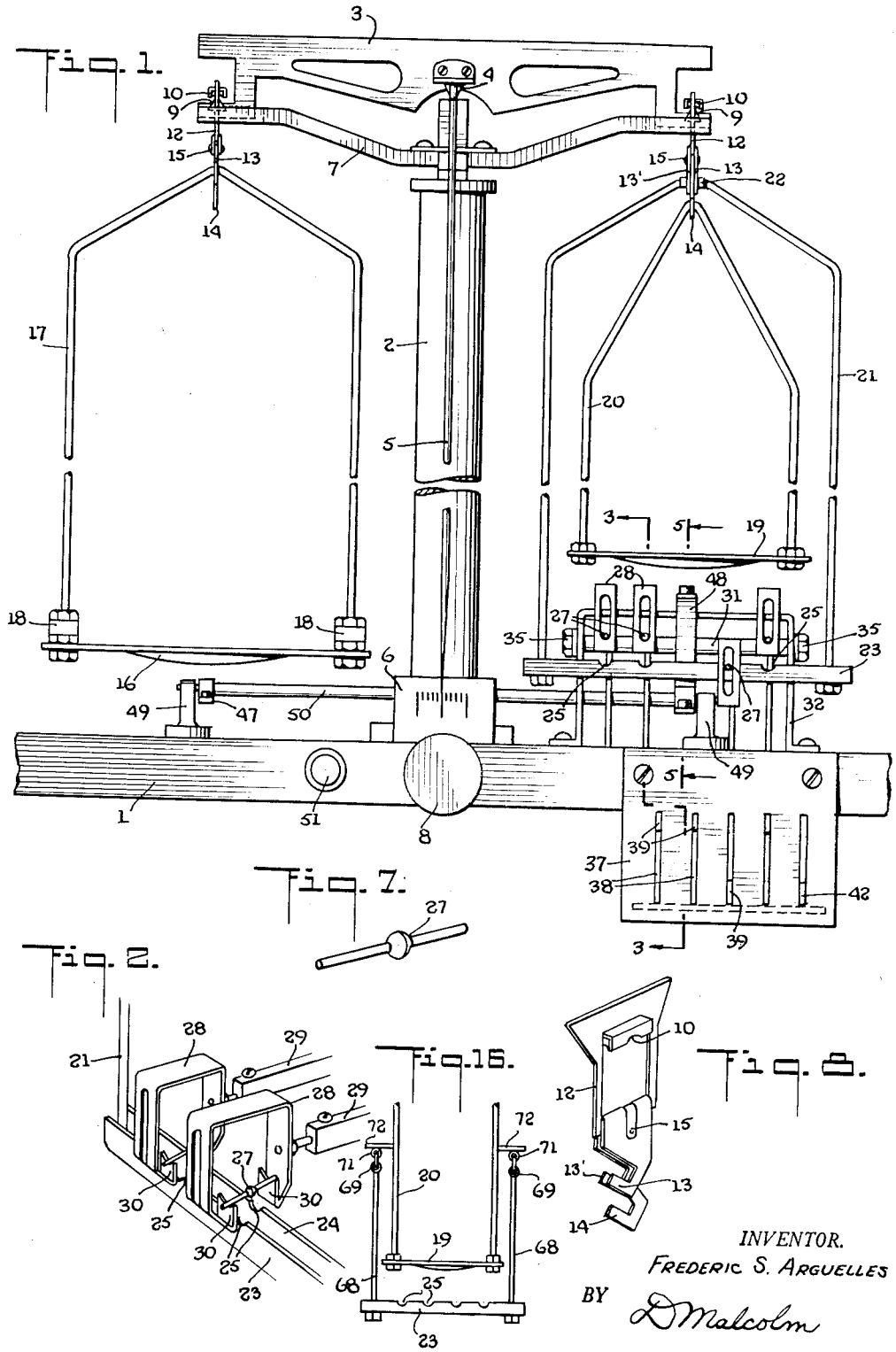
INVENTOR.
FREDERIC S. ARGUELLES
BY D. Malcolm
ATTORNEY

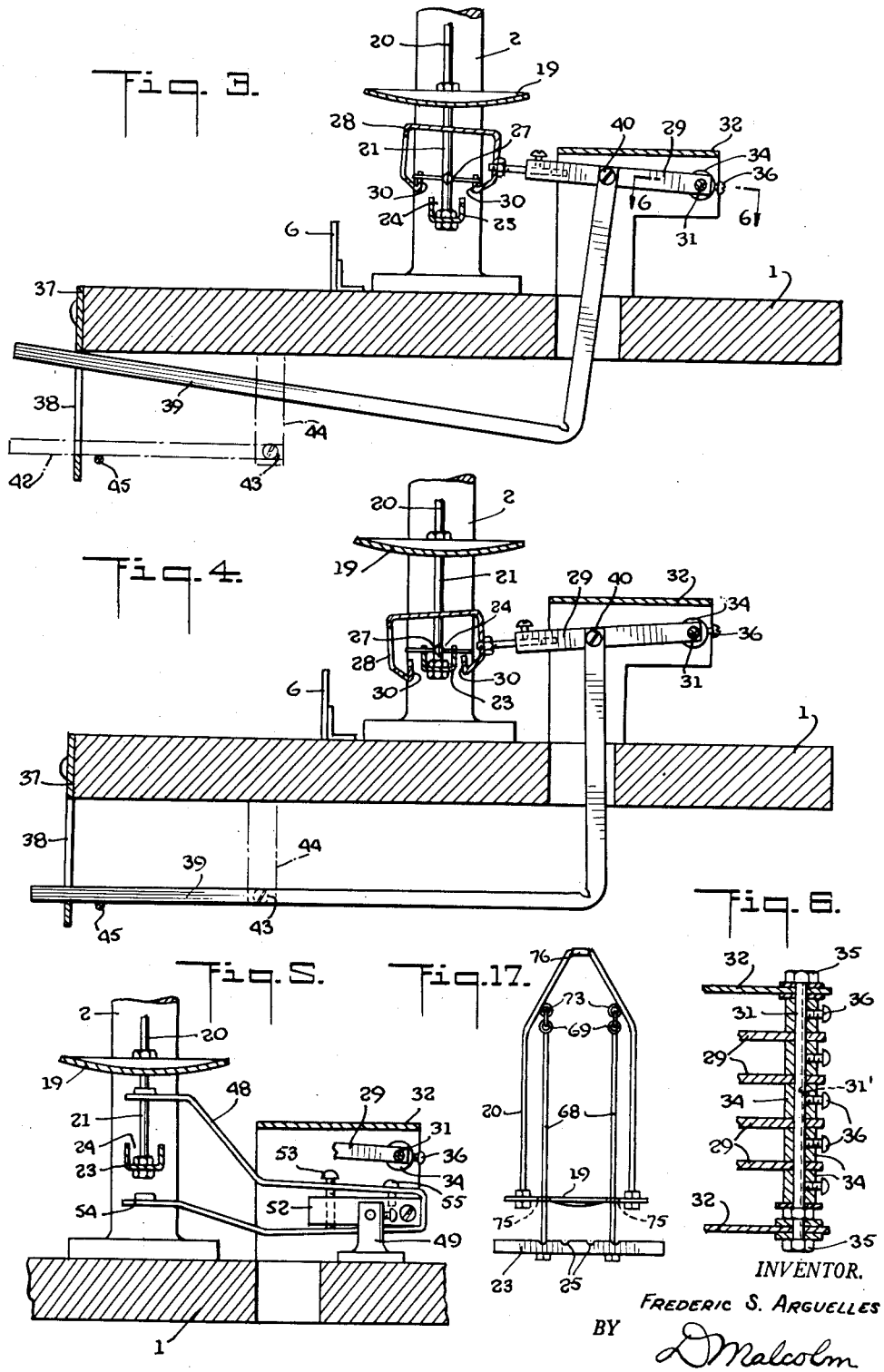

March 27, 1956 F. S. ARGUELLES 2,739,805
PRECISION BALANCE
Filed June 2, 1953 4 Sheets-Sheet 3
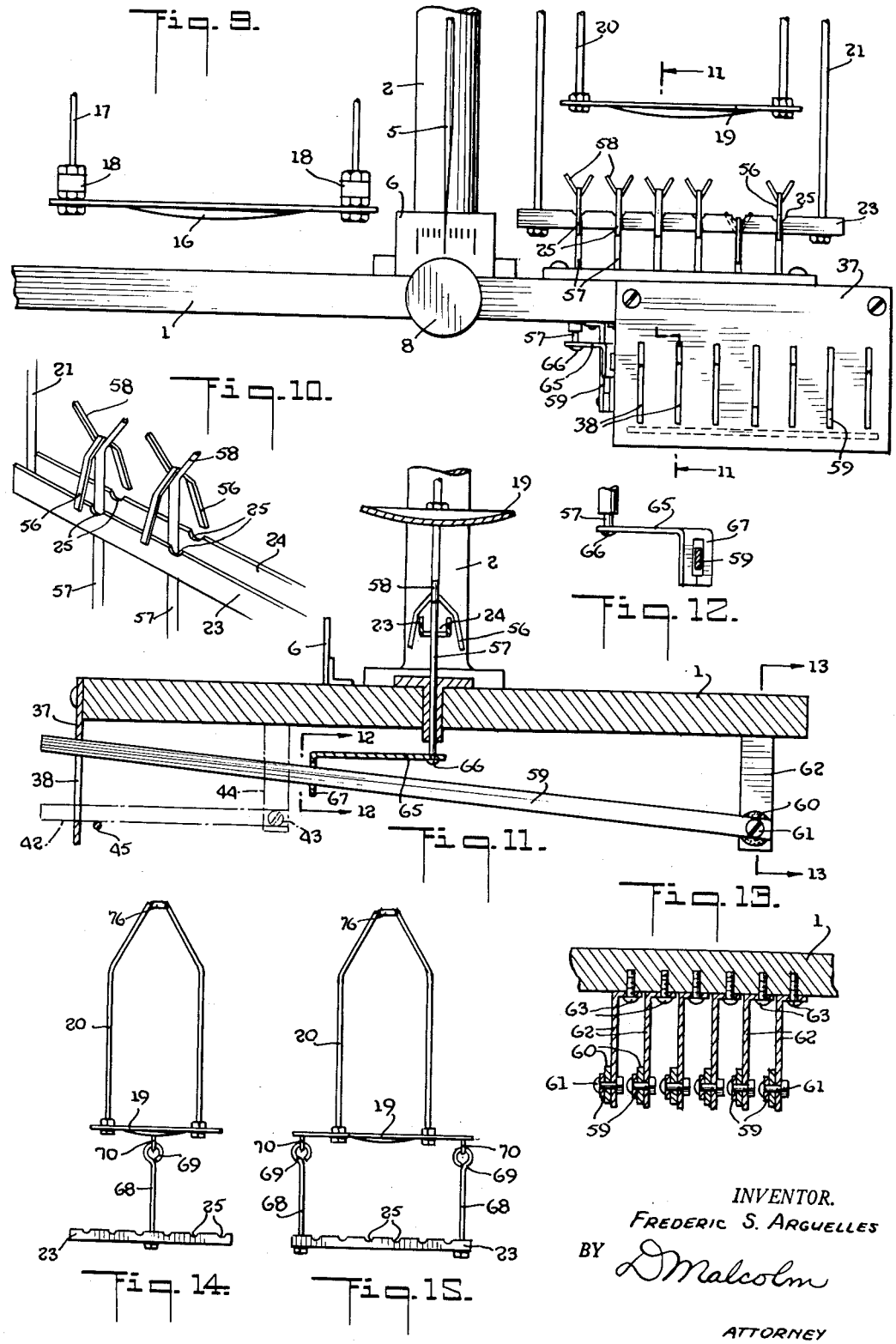
INVENTOR.
FREDERIC S. ARGUELLES
BY 
ATTORNEY March 27, 1956

F. S. ARGUELLES 2,739,805

PRECISION BALANCE

Filed June 2, 1953

INVENTOR.
FREDERIC S. ARGUELLES
BY D. Malcolm
ATTORNEY

United States Patent Office 2,739,805
Patented Mar. 27, 1956

2,739,805

PRECISION BALANCE

Frederic S. Arguelles, New York, N. Y.

Application June 2, 1953, Serial No. 359,172

22 Claims. (Cl. 265—54)

This invention relates to precision balances such as are employed for weighing objects of very small mass, and it has for its object to simplify the construction and operation of such balances.

Another object of the invention is to provide a balance of the above type having a novel and improved keyboard mechanism for controlling the application of weights to the balance during the weighing operation.

Still another object is to provide a simple and efficient weight adjusting mechanism controlled by a keyboard conveniently located at the lower front of the balance adjacent various other control members which are customarily used during the weighing operation, whereby the operator may easily and quickly apply any desired number or combination of weights to the balance without changing his normal position and with considerably less tedium than heretofore.

Various other objects and advantages will be apparent as the nature of the invention is more fully disclosed.

In the operation of analytical balances, such as microchemical balances which may be sensitive to one one-thousandth of a milligram, considerable time and energy are consumed in selecting and applying weights of various types to the balance beam. For example, in many such balances a rotatable and horizontally movable shaft, actuated by hand from outside the balance case, is employed to move rider weights or poises to various positions along the graduated balance beam. Aside from the fact that such poise-shifting mechanisms are often cumbersome, expensive and difficult to master because of their complicated construction, they are also objectionable because the actuating shaft projects from the top right-hand side of the balance far removed from the other control knobs, etc. which the operator is constantly using during the weighing operation. As a result, the operator finds it tiresome to continually raise his arm to manipulate the shaft controlling the position of the weights on the balance beam.

The balance of the present invention, in its simplest form, comprises a base supporting the usual standard, a beam pivoted on the standard, means such as a pan carried by one end of the beam for the reception of objects to be weighed, and a weighing unit suspended from the other end of the beam. This weighing unit preferably includes a pan for the reception of the usual weights employed in balances of this type, and a support such as a bar mounted in such a way that it can swing with respect to the adjacent weight pan. A plurality of spaced weight-supporting members or fingers are movably mounted adjacent said bar. Individual weights are supported by said fingers in one position of the latter, and, when each finger is moved to its other position, it deposits its weight in a predetermined position on the bar. In the various embodiments of the invention hereinafter described the weight-supporting members or fingers are actuated by a novel arrangement of key bars which are grouped somewhat like the keys of a typewriter in a convenient position at the lower front of the balance case convenient to all the other control members used during the weighing operation.

Although the novel features which are characteristic of this invention are set forth more in detail in the claims appended hereto, the nature and scope of the invention may be better understood by referring to the following description taken in connection with the accompanying drawings forming a part thereof, in which certain specific embodiments have been set forth for purposes of illustration.

In the drawings:

Fig. 1 is a front elevation of a precision balance embodying the invention, with the usual casing omitted in order to simplify the showing;

Fig. 2 is a detail perspective view of the weight support or bar and associated weight-lifting mechanism of Fig. 1;

Fig. 3 is a transverse section on line 3—3 of Fig. 1, illustrating the construction and operation of the keyboard mechanism controlling the application of weights to the balance;

Fig. 4 is a similar view, but with the parts in a different position;

Fig. 5 is a vertical section taken on line 5—5 of Fig. 1;

Fig. 6 is a detail section on line 6—6 of Fig. 3;

Fig. 7 is a perspective view of one of the weights employed in the balance of Fig. 1;

Fig. 8 is a perspective view of one of the yoke frames pivoted on the balance beam of Fig. 1;

Fig. 9 is a fragmentary front elevation of a balance similar to that of Fig. 1 but embodying a modification of the invention;

Fig. 10 is a detail perspective view of the weight bar and associated weight-lifting mechanism of Fig. 9;

Fig. 11 is a transverse section taken on line 11—11 of Fig. 9;

Fig. 12 is a detail section on line 12—12 of Fig. 9;

Fig. 13 is a detail section on line 13—13 of Fig. 11;

Fig. 14 is a detail view illustrating a weight-supporting bar suspended intermediate its ends from beneath the center of the weight pan;

Fig. 15 is a detail view showing a weight-supporting bar suspended at its ends from opposite edge portions of the weight pan;

Fig. 16 is a detail view showing a weight-supporting bar suspended at its ends by supporting members including links, the supporting members being connected to and depending from the legs of the weight pan-supporting bow exteriorly of the legs;

Fig. 17 is similar to Fig. 16, the weight-supporting bar being suspended from the weight pan-supporting bow by suspension members disposed interiorly of its legs, the weight pan being apertured to permit a free-swinging suspension of the bar;

Figure 18:
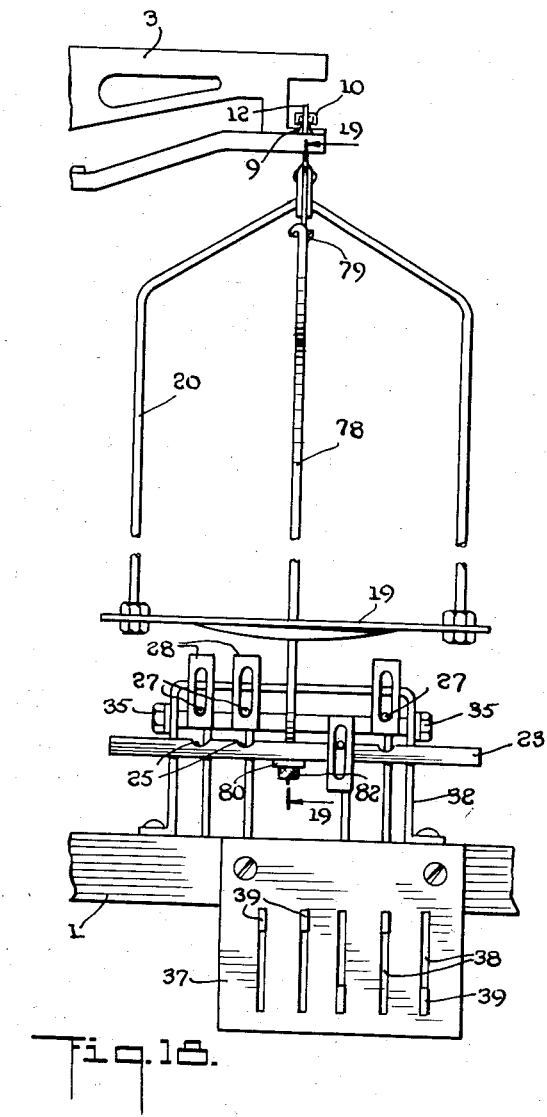
Fig. 18 is a partial front elevation of a balance illustrating still another embodiment of the invention.

In the following description certain specific terms are used for convenience in referring to various details of the invention. These terms, however, are to be interpreted as broadly as the state of the art will permit.

The balance shown in Figs. 1 to 8 includes a base 1 which in practice supports a glass case (not shown) to enclose the entire mechanism. Mounted on base 1 is the standard 2 at the upper end of which the beam 3 is pivoted on the usual knife edge 4. Secured to the beam 3 is the usual pointer 5 adapted to move over the scale 6, as shown in Fig. 1. The standard 2 carries the usual vertically movable bridge or cradle 7, actuated by the usual rotatable knob 8, to support the beam 3 so as to avoid damaging the knife edge pivot when not in use.

At the ends of beam 3 are knife edges 9 on which are pivoted the knife edge bearings 10 of yoke frames 12. The yoke frames carry upper and lower hooks 13 and 14 which are pivoted thereto at 15. In the case of the yoke frame 12 at the right of Fig. 1 (shown in detail in Fig. 8) there are two parallel upper hooks 13 and 13′, slightly spaced from each other, for a purpose hereinafter explained.

A pan 16, for the reception of objects to be weighed, has its bow 17 suspended from one of the hooks 13 or 14 at the left-hand end of the beam 3 in Fig. 1. Some operators, when called upon to weigh an object such as a piece of thread or wire, prefer to hang it on the free hook above pan 16 instead of placing it on the pan itself. Suitable heavily weighted collars 18 are secured between pan 16 and the ends of bow 17 in order to equalize the weight on both ends of beam 3 since, for reasons which will presently appear, the beam would otherwise be in a state of unbalance.

A pan 19, for the reception of manually-applied weights from a standard weight set accompanying the balance, has its bow 20 suspended from the lower hook 14 of the yoke frame 12 at the right-hand end of beam 3 in Fig. 1. A second larger bow 21 is suspended from the double upper hookk 13—13$^1$ at the right of beam 3 clear of the pan 19 and bow 20. The apex of said bow 21 is straight rather than pointed and has a small surrounding collar 22 which seats in the spaced twin hooks 13—13$^1$. This prevents the bow 21 from rotating and maintains said bow in longitudinal alignment with beam 3. The ends of the bow 21 carry an elongated bar 23 having a longitudinal slot 24 and spaced transverse semi-circular notches 25, as best shown in Figs. 1 and 2. The bar 23 is thus suspended freely from beam 3 beneath the pan 19 in a plane parallel to the base 1 of the balance.

In the embodiment illustrated in Fig. 1 the bar 23 contains four notches 25 in each of which a suitable weight or poise 27 is adapted to rest, although it will be understood that the number of notches, and hence the number of weights, may be varied as desired. Although the weights 27 may be of any suitable type, those employed in the balance of Figs. 1 to 8 are illustrated in Fig. 7 as consisting of a central double-cone portion adapted to fit inside the slot 24 of bar 23, and lateral spindles adapted to rest in the notches 25 of said bar. In one typical balance, which I cite merely for purposes of illustration, the values of the four weights 27 may be 100 mg., 200 mg., 300 mg. and 500 mg., respectively.

The mechanism for moving the weights 27 on and off the bar comprises a plurality of fingers 28 carried by individual arms 29 and having V-shaped grips 30 which straddle the bar 23 at spaced intervals corresponding with the notches 25 in said bar, as shown in Figs. 1 and 2. The arms 29 are pivotally mounted on a shaft 31 carried by a bracket 32 which is secured to base 1, as shown in Fig. 1. Referring particularly to Fig. 6, the shaft 31 carries spacers or oil-less bearings 34 disposed on both sides of the various arms 29, and nuts 35 outside the bracket 32 which are tightened to secure the arms frictionally on the shaft. Screws 36 in each bearing 34 extend into a longitudinal slot 31$^1$ in the shaft 31, permitting the bearings 34 to move longitudinally on shaft 31 while preventing said bearings from rotating about the shaft. This arrangement provides a common easily-adjusted friction bearing for the arms 29.

Secured to the front of base 1 is a keyboard panel 37 having a plurality of vertical slots 38 which in the embodiment illustrated (Fig. 1) are five in number. A plurality of L-shaped key bars 39, here shown to be four in number, have their inner ends pivotally secured at 40 to the respective arms 29 and their outer ends extending outwardly through individual slots 38 in panel 37, as shown in Figs. 3 and 4. The upper and lower edges of slots 38 thus limit the up and down movement of the various key bars 39.

Whenever any key bar 39 is moved to the "up" position shown in Fig. 3, with its forward portion engaging the upper edge of its alloted slot 38 in panel 37, the pivoted arm 29 connected to that particular key bar is elevated and the V-shaped grips 30 on the fingers 28 of that arm 29 lift the associated weight 27 off the bar 23 and hold it in elevated position clear of said bar 23. Normally, when the balance is not in use, all of the key bars 39 are in the "up" position shown in Fig. 3, and are retained in such elevated position by the friction bearing of the arms 29 previously described, and at such time all of the weights 27 are off the bar 23.

Conversely, whenever any key bar 39 is moved from the "up" position of Fig. 3 to the "down" position shown in Fig. 4, the weight 27 carried by the descending fingers 28 of the associated arm 29 enters the allotted notches 25 of bar 23 before the key bar completes its down-stroke; and when said key bar reaches the lower limit of its travel the V-shaped grips 30 of said fingers 28 have descended until they are well clear of said weight 27 as shown in Fig. 4.

A clearing bar 42, loosely pivoted at 43 to a bracket 44 beneath the base 1 projects outwardly through the fifth vertical slot 38 in the keyboard panel 37, and carries an elongated rod 45 which is engageable beneath all of the key bars 39 for elevating same in unison. When the clearing bar 42 is raised to the top of its slot 38 it raises all the key bars 39 to the "up" position shown in Fig. 3; and when released the clearing bar drops back to the bottom of its slot 38, while the key bars 39 remain elevated as previously described.

Precision balances of the type described above customarily include a pan raising mechanism for arresting the movement of the pans, such as the pans 16 and 19 of Fig. 1, when the balance is not in use, or when anything is being placed on the pans for weighing purposes. Such mechanism may comprise a pair of arms 47 and 48 pivoted in uprights 49 on base 1 and connected by a rod 50 which is actuated by a plunger 51 on the front of the balance. When the plunger 51 is released, the weight of rod 50 elevates the arms 47 and 48 into engagement with the under surfaces of pans 16 and 19; and when plunger 51 is pushed inwardly, and rotated slightly to lock it in such position, the arms 47 and 48 are lowered to release said pans 16 and 19. Figs. 1 and 5 illustrate a modification of such mechanism wherein the arm 48 beneath pan 19 is formed of an elongated strip of flexible metal which is bent over a spacer 52 carried by rod 50, and held thereon by adjusting screws 53 and 55, and extended forward to provide another arm 54 which is engageable beneath the weighing bar 23 to arrest its motion simultaneously with that of the pans. The elongated adjusting screw 53 (which is threaded in spacer 52) extends loosely through an enlarged opening in arm 48 and abuts against the arm 54, so that, by turning said screw 53, the height of arm 54 may be adjusted without adjusting arm 48. The position of said arm 48 is adjusted by turning the shorter screw 55, as will be evident from Fig. 5.

In the modification of the invention illustrated in Figs. 9 to 13, the balance proper is similar to that described above, hence similar reference numerals are used to designate corresponding parts in the several views. The longitudinally slotted bar 23 in Fig. 9 has six semi-circular notches 25, hence the keyboard panel 37 on the front of the balance has seven vertical slots 38, six of said slots being for the weight-controlling key bars hereinafter described, and the other one (in the center of panel 37) being for the clearing bar. In this embodiment of the invention, furthermore, I prefer to employ weights or poises 56 of inverted U-shape with peaked tops, which are adapted to rest in the notches 25 astride the longitudinal slot 24 of bar 23. The embodiment of Figs. 9 to 13 is especially suited to balances of large capacity, and the number of weights 56 (and notches 25 on bar 23) is limited only by practical considerations. Assuming that six weights are employed, of such values as 1 g., 2 g., 3 g., 5 g., 10 g. and 20 g., it would be undesirable to arrange said weights in that chronological order with all the heaviest weights concentrated on one side of the center of bar 23 since such arrangement might cause the bar 23 and bow 21 to tilt excessively. However, that possibility is avoided by arranging the weights in a different order such as 1 g., 2 g., 20 g., 10 g., 5 g. and 3 g., reading from left to right in Fig. 9.

The mechanism for moving the weights 56 on and off the bar 23 in Figs. 9 to 13 comprises a plurality of vertically movable plungers 57 extending upwardly through the base 1 of the balance and having V-shaped weight-supporting fingers 58 movable through the longitudinal slot 24 in bar 23 at spaced intervals corresponding with the notches 25 in said bar. For actuating the weight-lifting mechanism I employ a plurality of key bars 59, here shown to be six in number, which extend through individual slots 38 in panel 37 and have their inner ends frictionally pivoted by washers 60 and adjustable bolts 61 to brackets 62 which are secured as by screws 63 beneath base 1 of the balance, as shown in Figs. 11 and 13. The plungers 57 have forwardly-extending arms or extensions 65 beneath base 1, pivoted to said plungers at 66 so as to be free to swing in a lateral direction, and these extensions 65 have turned-down slotted end portions 67 through which the respective key bars 59 pass, as shown in Figs. 11 and 12.

As will be evident from Fig. 9, whenever any key bar 59 is moved to the "up" position, its associated plunger 57 is raised in the slot 24 of bar 23 and the V-shaped finger 58 of that plunger lifts the associated weight 56 off the bar 23 and holds it in elevated position clear of the bar 23. Conversely, whenever any elevated key bar 59 is moved to the "down" position, the weight 56 carried by the descending finger 58 of the associated plunger 57 enters the notches 25 of bar 23 before the key bar completes its downstroke; and when said key bar reaches the lower limit of its travel the associated finger 58 lies within the longitudinal slot 24 of bar 23 entirely out of contact with said bar. The construction and operation of the clearing bar 42, illustrated in Fig. 11, are the same as described above in connection with Figs. 1 to 8.

Fig. 14 illustrates a modification of the invention in which the weight-supporting bar 23, which may be exactly like the bar previously described, carries a rigid central rod 68 having a loop 69 at its upper end by means of which said bar is freely suspended from either a loop or short chain of links 70 on the central underside of weight pan 19. Fig. 15 is the same except that two rods 68 secured to the ends of bar 23 are suspended from diametrically opposed loops or links 70 on the underside of pan 19, the diameter of said pan being increased as illustrated if such increased size is necessitated by the length of bar 23. These alternate constructions may be used with either of the weight-controlling mechanisms previously described.

In the modifications of Figs. 16 and 17 the weight-supporting bar 23 is suspended directly from the bow 20 instead of from the weight pan 19. Thus in Fig. 16 the two rods 68 secured to the ends of bar 23 are suspended from loops 71 depending from two outwardly extending arms 72 on the bow 20. In Fig. 17, however, the two rods 68 carrying bar 23 are suspended from loops 73 fixed to the upper sloping branches of the bow 20 which carries weight pan 19; and in this constuction the rods 68 extend freely through enlarged openings 75 in said weight pan. In all the modifications of Figs. 14 to 17, inclusive, the apex of the bow 20 is preferably straight rather than pointed and has a small surrounding collar 76 (similar to collar 22 of Fig. 1) which seats in the double hook of a yoke frame similar to that illustrated in Fig. 8.

Figure 19:
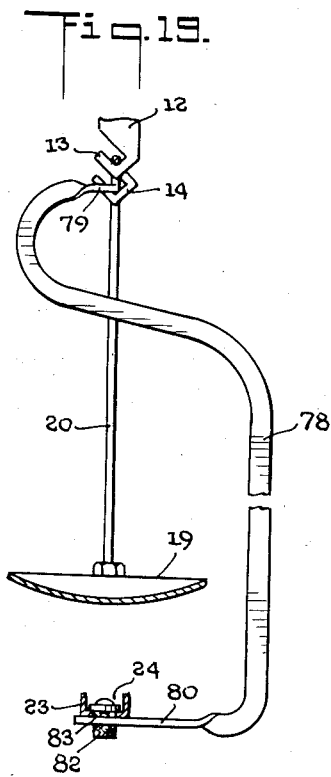
Fig. 19 is a vertical section taken on line 19—19 of Fig. 18.
Figure 20:
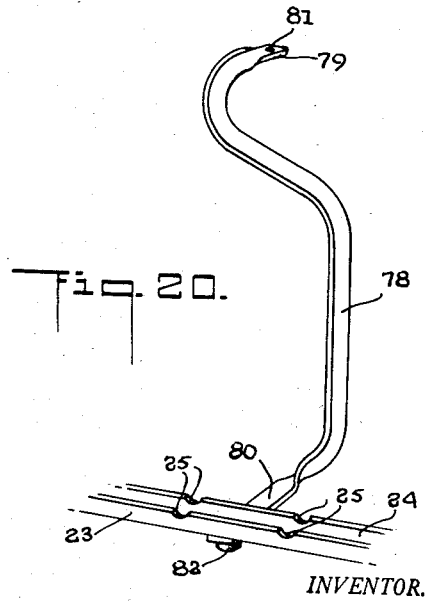
Fig. 20 is a perspective view of the weight hanger shown in Figs. 18 and 19.
Figure 21:
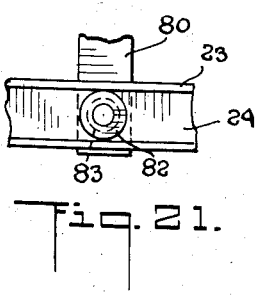
Fig. 21 is a plan view showing the adjustable mounting of the weight bar on the hanger of Figs. 18 to 20.

In the embodiment of the invention shown in Figs. 18 to 21, the weight pan 19 and its bow 20 at the right-hand end of beam 3 are preferably the same size as the pan 16 and bow 17 (Fig. 1) at the left-hand end of the beam, and said bow 20 is suspended from the upper hook 13 of the yoke frame 12 as shown in Fig. 19. In this embodiment, however, the slotted weight bar 23 is carried by a hanger 78 comprising a flat strip of metal in the general shape of the letter S having its upper and lower extremities twisted at an angle of 90° to the body of the hanger to form flat parallel ends 79 and 80, respectively, as shown in Figs. 19 and 20.

The upper flat end 79 of hanger 78 has a hole 81 which engages in the lower hook 14 of yoke frame 12. The weight bar 23 is adjustably mounted on the lower flat end 80 of hanger 78 parallel to bow 20 by means of a bolt 82 which passes through a hole in said end 80 and through a larger hole 83 in the longitudinal center of bar 23. By properly adjusting bar 23 on the end 80 of hanger 78, and then tightening the bolt 82, the bar 23 may be exactly positioned with respect to the grips 30 of the weight-lifting fingers 28 previously described.

As shown in Fig. 18, the hanger 78 is suspended from yoke frame 12 in a plane perpendicular to the plane of the pan bow 20, and, since the hanger curves in the general shape of the letter S to the rear of bow 20 and pan 19, and then forwardly beneath the pan 19, said pan 19 is entirely unobstructed at the front of the balance and is readily accessible for the deposit and removal of weights.

While certain specific examples have been shown and described herein for purposes of illustration, it will be evident to those skilled in the art that the invention is capable of various modifications and adaptations within the scope of the appended claims.

The invention claimed is:

1. A balance comprising a base, a standard mounted on said base, a beam pivoted on said standard, means carried by one end of said beam for the reception of objects to be weighed, a pair of bows suspended independently of each other from the other end of said beam, a pan carried by one of said bows, a bar carried by the other bow beneath said pan, a plurality of weight-supporting members movable adjacent said bar, weights supported by said members in one position of the latter and engageable with said bar in another position of said members, and means for actuating said members.

2. A balance comprising a base, a standard mounted on said base, a beam pivoted on said standard, means carried by one end of said beam for the reception of objects to be weighed, a pair of bows suspended independently of each other from the other end of said beam, a pan carried by one of said bows, a bar carried by the other bow beneath said pan, a plurality of movable plungers extending through said base and having weight-supporting members movable adjacent said bar, weights supported by said members in one position of said plungers and engageable on said bar clear of said members in another position of said plungers, and means including a plurality of key bars pivotally mounted beneath said base for actuating said plungers.

3. A balance comprising a base, a standard mounted on said base, a beam pivoted on said standard, means carried by one end of said beam for the reception of objects to be weighed, a pair of bows suspended independently of each other from the other end of said beam, a pan for the reception of weights carried by one of said bows, a bar carried by the other bow beneath said pan, a plurality of vertically movable plungers extending upwardly through said base and having weight-supporting fingers movable adjacent said bar at spaced intervals, weights supported by said fingers in one vertical position of said plungers and engageable on said bar clear of said fingers in another vertical position of said plungers, a panel having a plurality of spaced vertical slots on said base, a plurality of key bars pivotally mounted beneath said base and extending outwardly through individual slots in said panel, and means connecting said plungers to the respective key bars for raising and lowering said plungers.

4. A balance comprising a base, a standard mounted on said base, a beam pivoted on said standard, means suspended from one end of said beam for the reception of objects to be weighed, a pair of bows suspended independently of each other from the other end of said beam, a pan for the reception of weights carried by one of said bows, a bar carried by the second bow beneath said pan in a plane parallel to said base, a plurality of vertically movable plungers extending upwardly through said base and having weight-supporting fingers movable adjacent said bar at spaced intervals, weights supported by said fingers in one vertical position of said plungers and engageable on said bar clear of said fingers in another vertical position of said plungers, a panel having a plurality of spaced vertical slots on said base, a plurality of key bars pivotally mounted beneath said base and extending outwardly through individual slots in said panel, means connecting said plungers to the respective key bars for raising and lowering said plungers, and means including a clearing bar for actuating said key bars in unison.

5. A balance comprising a base, a standard mounted on said base, a beam pivoted on said standard, means suspended from one end of said beam for the reception of objects to be weighed, a pair of bows suspended independently of each other from the other end of said beam, a pan for the reception of weights carried by one of said bows, a bar carried by the second bow beneath said pan in a plane parallel to said base, a plurality of vertically movable plungers extending upwardly through said base and having weight-supporting fingers movable adjacent said bar at spaced intervals, weight supported by said fingers in one vertical position of said plungers and engageable on said bar clear of said fingers in another vertical position of said plungers, a panel having a plurality of spaced vertical slots on said base, a plurality of key bars pivotally mounted beneath said base and extending outwardly through individual slots in said panel, means connecting said plungers to the respective key bars for raising and lowering said plungers, and a clearing bar operable in a slot in said panel and having means for actuating said key bars in unison.

6. A balance comprising a base, a standard mounted on said base, a beam pivoted on said standard, means suspended from one end of said beam for the reception of objects to be weighed, a pair of hooks disposed one above the other and suspended from the other end of said beam, a pan for the reception of weights having a bow suspended from the lower hook of said pair, a second bow suspended from the upper hook of said pair clear of said first-mentioned bow and pan, a bar carried by the ends of said second bow beneath said pan in a plane parallel to said base, a plurality of vertically movable plungers extending upwardly through said base and having weight-supporting fingers movable adjacent said bar, weights supported by said fingers in one vertical position of said plungers and engageable on said bar clear of said fingers in another vertical position of said plungers, a panel having a plurality of spaced vertical slots on said base, a plurality of key bars pivotally mounted beneath said base and extending outwardly through individual slots in said panel, means connecting said plungers to the respective key bars for raising and lowering said plungers, and a clearing bar operable in a slot in said panel and having means for actuating said key bars in unison.

7. A balance comprising a base, a standard mounted on said base, a beam pivoted on said standard, yoke frames pivotally mounted adjacent the respective ends of said beam, a pan suspended from one of said yoke frames for the reception of objects to be weighed, a pair of hooks disposed one above the other and carried by the second yoke frame, a scale pan for the reception of weights having a bow suspended from the lower hook of said pair, a second larger bow suspended from the upper hook of said pair clear of the field of movement of said first-mentioned bow and scale pan, a bar having spaced notches carried by the ends of said second bow in a plane parallel to said base, a plurality of movable arms pivoted on a common friction bearing on said base and having weight-supporting fingers straddling said bar at spaced intervals corresponding with the notches in said bar, weights carried by said fingers in the raised position of said arms and shaped to rest in the notches of said bar in the lowered position of said arms, a keyboard panel having a plurality of spaced vertical slots on the front of said base, and a plurality of key bars pivotally secured to said arms and extending outwardly through individual slots in said panel for independently raising and lowering said fingers.

8. A balance comprising a base, a standard mounted on said base, a beam pivoted on said standard, yoke frames pivotally mounted adjacent the respective ends of said beam, a pan suspended from one of said yoke frames for the reception of objects to be weighed, a pair of hooks disposed one above the other and carried by the second yoke frame, a scale pan for the reception of weights having a bow suspended from the lower hook of said pair, a second larger bow suspended from the upper hook of said pair clear of the field of movement of said first-mentioned bow and scale pan, a bar having spaced notches carried by the ends of said second bow in a plane parallel to said base, a plurality of movable arms pivoted on a common friction bearing on said base and having weight-supporting fingers straddling said bar at spaced intervals corresponding with the notches in said bar, weights carried by said fingers in the raised position of said arms and shaped to rest in the notches of said bar in the lowered position of said arms, a keyboard panel having a plurality of spaced vertical slots on the front of said base, a plurality of key bars pivotally secured to said arms and extending outwardly through individual slots in said panel for independently raising and lowering said fingers, and means for elevating said key bars in unison.

9. A balance comprising a base, a standard mounted on said base, a beam pivoted on said standard, yoke frames pivotally mounted adjacent the respective ends of said beam, a pan suspended from one of said yoke frames for the reception of objects to be weighed, a pair of hooks disposed one above the other and carried by the second yoke frame, a scale pan for the reception of weights having a bow suspended from the lower hook of said pair, a second larger bow suspended from the upper hook of said pair clear of the field of movement of said first-mentioned bow and scale pan, a bar having spaced notches carried by the ends of said second bow in a plane parallel to said base, a plurality of movable arms pivoted on a common friction bearing on said base and having weight-supporting fingers straddling said bar at spaced intervals corresponding with the notches in said bar, weights carried by said fingers in the raised position of said arms and shaped to rest in the notches of said bar in the lowered position of said arms, a keyboard panel having a plurality of spaced vertical slots on the front of said base, a plurality of key bars pivotally secured to said arms and extending outwardly through individual slots in said panel for independently raising and lowering said fingers, and a clearing bar pivoted beneath said base and extending outwardly through a slot in said panel and having an elongated portion engageable beneath all of said key bars for elevating same in unison.

10. A balance comprising a base, a standard mounted on said base, a beam pivoted on said standard, means suspended from one end of said beam for the reception of objects to be weighed, a pair of hooks disposed one above the other and suspended from the other end of said beam, a scale pan for the reception of weights having a bow suspended from the lower hook of said pair, a second bow suspended from the upper hook of said pair clear of said first-mentioned bow and scale pan, a longitudinally slotted bar carried by the ends of said second bow beneath said scale pan in a plane parallel to said base, a plurality of vertically movable plungers extending upwardly through said base and having weight-supporting fingers movable through the slot in said bar at spaced intervals, weights carried by said fingers in the raised position of said plungers and shaped to span said slot and rest on said bar in the lowered position of said plungers, a panel having a plurality of spaced vertical slots on said base, a plurality of key bars pivotally mounted beneath said base and extending outwardly through individual slots in said panel, and means connecting said plungers to the respective key bars for independently raising and lowering said plungers.

11. A balance comprising a base, a standard mounted on said base, a beam pivoted on said standard, means suspended from one end of said beam for the reception of objects to be weighed, a pair of hooks disposed one above the other and suspended from the other end of said beam, a scale pan for the reception of weights having a bow suspended from the lower hook of said pair, a second bow suspended from the upper hook of said pair clear of said first-mentioned bow and scale pan, a longitudinally slotted bar carried by the ends of said second bow beneath said scale pan in a plane parallel to said base, a plurality of vertically movable plungers extending upwardly through said base and having weight-supporting fingers movable through the slot in said bar at spaced intervals, weights carried by said fingers in the raised position of said plungers and shaped to span said slot and rest on said bar in the lowered position of said plungers, a panel having a plurality of spaced vertical slots on said base, a plurality of key bars pivotally mounted beneath said base and extending outwardly through individual slots in said panel, means connecting said plungers to the respective key bars for independently raising and lowering said plungers, and means for elevating said key bars in unison.

12. A balance comprising a base, a standard mounted on said base, a beam pivoted on said standard, yoke frames pivotally mounted adjacent the respective ends of said beam, means suspended from one of said yoke frames for the reception of objects to be weighed, a pair of hooks disposed one above the other and carried by the second yoke frame, a scale pan for the reception of weights having a bow suspended from the lower hook of said pair, a second bow freely suspended from the upper hook of said pair clear of said first-mentioned bow and scale pan, a longitudinally slotted bar carried by the ends of said second bow beneath said scale pan in a plane parallel to said base, a plurality of vertically movable plungers extending upwardly through said base and having weight-supporting fingers movable through the slot in said bar, weights carried by said fingers in the raised position of said plungers and shaped to span said slot and rest on said bar in the lowered position of said plungers, a panel having a plurality of spaced vertical slots on the front of said base, a plurality of key bars pivotally mounted beneath said base and extending outwardly through individual slots in said panel, means connecting said plungers to the respective key bars for independently raising and lowering said plungers, and means for elevating said key bars in unison.

13. A balance comprising a base, a standard mounted on said base, a beam pivoted on said standard, yoke frames pivotally mounted adjacent the respective ends of said beam, means suspended from one of said yoke frames for the reception of objects to be weighed, a pair of hooks disposed one above the other and carried by the second yoke frame, a scale pan for the reception of weights having a bow suspended from the lower hook of said pair, a second larger bow freely suspended from the upper hook of said pair clear of said first-mentioned bow and scale pan, a longitudinally slotted bar having spaced notches carried by the ends of said second bow beneath said scale pan in a plane parallel to said base, a plurality of vertically movable plungers extending upwardly through said base and having weight-supporting fingers movable through the slot in said bar at spaced intervals corresponding with the notches in said bar, weights carried by said fingers in the raised position of said plungers and shaped to span said slot and rest in said notches of said bar in the lowered position of said plungers, a panel having a plurality of spaced vertical slots on the front of said base, a plurality of key bars pivotally mounted beneath said base and extending outwardly through individual slots in said panel, means connecting said plungers to the respective key bars for independently raising and lowering said plungers, and a clearing bar operable in a slot in said panel and having means for elevating said key bars in unison.

14. A balance comprising a base, a standard mounted on said base, a beam pivoted on said standard, yoke frames pivotally mounted adjacent the respective ends of said beam, a pan suspended from one of said yoke frames for the reception of objects to be weighed, a pair of hooks disposed one above the other and carried by the second yoke frame, a scale pan for the reception of weights having a bow suspended from the lower hook of said pair, a second larger bow freely suspended from the upper hook of said pair clear of said first-mentioned bow and scale pan, a longitudinally slotted bar having spaced notches carried by the ends of said second bow beneath said scale pan in a plane parallel to said base, a plurality of vertically movable plungers extending upwardly through said base and having weight-supporting fingers movable through the slot in said bar at spaced intervals corresponding with the notches in said bar, weights carried by said fingers in the raised position of said plungers and shaped to span said slot and rest in said notches of said bar in the lowered position of said plungers, a keyboard panel having a plurality of spaced vertical slots on the front of said base, a plurality of key bars pivoted in individually adjustable friction bearings beneath said base and extending outwardly through individual slots in said panel, extensions on said plungers beneath said base having slotted end portions freely engaging the respective key bars for independently raising and lowering said plungers, and a clearing bar operable in a slot in said panel and having means for elevating said key bars in unison.

15. A balance comprising a base, a standard mounted on said base, a beam pivoted on said standard, yoke frames pivotally mounted adjacent the respective ends of said beam, a pan suspended from one of said yoke frames for the reception of objects to be weighed, a pair of hooks disposed one above the other and carried by the second yoke frame, a scale pan for the reception of weights having a bow suspended from the lower hook of said pair, a second larger bow suspended from the upper hook of said pair clear of said first-mentioned bow and scale pan, a longitudinally slotted bar having spaced notches carried by the ends of said second bow beneath said scale pan in a plane parallel to said base, a plurality of vertically movable plungers extending upwardly through said base and having weight-supporting fingers movable through the slot in said bar at spaced intervals corresponding with the notches in said bar, weights carried by said fingers in the raised position of said plungers and shaped to span said slot and rest in said notches of said bar in the lowered position of said plungers, a keyboard panel having a plurality of spaced vertical slots on the front of said base, a plurality of key bars pivoted in individually adjustable friction bearings beneath said base and extending outwardly through individual slots in said panel, extensions on said plungers beneath said base having slotted end portions freely engaging the respective key bars for independently raising and lowering said plungers, and a clearing bar loosely pivoted beneath said base and extending outwardly through a slot in said panel and having an elongated portion engageable beneath all of said key bars for elevating same in unison.

16. A balance comprising a base, a standard mounted on said base, a beam pivoted on said standard, means carried by one end of said beam for the reception of objects to be weighed, a pan for the reception of weights, a bow suspended from the other end of said beam, said bow comprising downwardly extending portions connected to said pan, a bar extending beneath said pan parallel to said base, supporting means including link means connecting said bar to said downwardly extending portions of said bow whereby said bar is freely suspended, a plurality of vertically movable plungers carried by said base and having weight-supporting fingers adjacent said bar, weights supported by said fingers in one vertical position of said plungers and engageable with said bar clear of said fingers in another vertical position of said plungers, and means for actuating said plungers independently to move said weights onto and off said bar.

17. A balance according to claim 16, wherein said supporting means depend from said link means exteriorly of said downwardly extending portions of said bow and exteriorly of said pan.

18. A balance according to claim 16, wherein said supporting means depend from said link means interiorly of said downwardly extending portions of said bow and interiorly of said pan, said pan being apertured to provide clearance for said supporting means.

19. A balance comprising a standard, a beam pivoted on said standard, means carried by one end of said beam for the reception of objects to be weighed, a weighing unit suspended from the other end of said beam and including a pan for the reception of weights and a bar positioned beneath said pan and freely mounted to swing with respect to said beam and said pan, a plurality of weight-supporting members movable adjacent said bar, weights supported by said members in one position of the latter and engageable with said bar in another position of said members, and means for moving said members.

20. A balance comprising a standard, a beam pivoted on said standard, means carried by one end of said beam for the reception of objects to be weighed, a pan for the reception of weights having a bow suspended from the other end of said beam, a bar suspended from said bow in a plane beneath said pan, a plurality of weight-supporting members movable adjacent said bar, weights supported by said members in one position of the latter and engageable with said bar in another position of said members, and means for moving said members.

21. A balance comprising a standard, a beam pivoted on said standard, means carried by one end of said beam for the reception of objects to be weighed, a weighing unit suspended from the other end of said beam and including a bow supporting a pan for the reception of weights and a hanger suspended in a plane perpendicular to the plane of said bow, a bar carried by said hanger in a plane parallel to said bow, and means for applying weights to said bar.

22. A balance comprising a standard, a beam pivoted on said standard, means carried by one end of said beam for the reception of objects to be weighed, a weighing unit suspended from the other end of said beam and including a bow supporting a pan for the reception of weights and a hanger suspended in a plane perpendicular to the plane of said bow, said hanger being generally S-shaped and having its lower end extending forwardly beneath said pan, a bar adjustably carried by the lower end of said hanger in a plane parallel to said bow, a plurality of weight-supporting members movable adjacent said bar, weights supported by said members in one position of the latter and engageable with said bar in another position of said members, and means for moving said members.

References Cited in the file of this patent

UNITED STATES PATENTS

| | | |
|---|---|---|
| 1,345,180 | Heusser | June 29, 1920 |
| 1,521,923 | Ainsworth | Jan. 6, 1925 |
| 2,010,666 | Haskins | Aug. 6, 1935 |
| 2,102,938 | Becker | Dec. 21, 1937 |
| 2,647,741 | Wasko | Aug. 4, 1953 |